(12) United States Patent
Shafer

(10) Patent No.: US 8,734,065 B2
(45) Date of Patent: May 27, 2014

(54) REAMING TOOL

(75) Inventor: William Stephen Shafer, Rushsylvania, OH (US)

(73) Assignee: Honda Motor Co., Ltd, Tokyo (JP)

( * ) Notice: Subject to any disclaimer, the term of this patent is extended or adjusted under 35 U.S.C. 154(b) by 1150 days.

(21) Appl. No.: 12/699,142

(22) Filed: Feb. 3, 2010

(65) Prior Publication Data

US 2011/0188953 A1 Aug. 4, 2011

(51) Int. Cl.
*B23B 35/00* (2006.01)
*B23B 45/14* (2006.01)

(52) U.S. Cl.
USPC ............. 408/1 R; 408/95; 408/112; 408/137; 408/111

(58) Field of Classification Search
USPC ............. 408/95–97, 110–112, 1 R, 137, 138
See application file for complete search history.

(56) References Cited

U.S. PATENT DOCUMENTS

| | | | | |
|---|---|---|---|---|
| 36,903 A | | 11/1862 | Hadley | |
| 389,613 A | * | 9/1888 | Thiem | 408/101 |
| 708,881 A | * | 9/1902 | Hervey | 408/101 |
| 875,383 A | * | 12/1907 | Schofield | 81/3.5 |
| 918,871 A | * | 4/1909 | Lawson | 408/97 |
| 1,470,143 A | | 10/1923 | Buterbaugh | |
| 1,499,110 A | * | 6/1924 | Lakes | 408/83.5 |
| 1,855,479 A | * | 4/1932 | Gaudreau | 408/87 |
| 1,895,990 A | | 1/1933 | Harcharick | |
| 2,508,402 A | * | 5/1950 | Kjerulff | 408/105 |
| 2,566,145 A | * | 8/1951 | Sandula | 408/241 R |
| 2,747,438 A | * | 5/1956 | Nevrincean | 408/95 |
| 2,997,900 A | | 8/1961 | Pugsley | |
| 3,119,205 A | | 1/1964 | Hoerer | |
| 3,267,501 A | * | 8/1966 | Wright | 408/110 |
| 3,677,655 A | * | 7/1972 | Ratteree et al. | 408/1 R |
| 3,701,352 A | * | 10/1972 | Bosworth | 606/184 |
| 3,738,766 A | * | 6/1973 | Elder, Jr. | 408/109 |
| 3,813,183 A | | 5/1974 | Abernathy et al. | |

(Continued)

FOREIGN PATENT DOCUMENTS

FR 2793175 A3 11/2000
JP 2003103409 A 4/2003

OTHER PUBLICATIONS

Sonnax, A Universal Solution for Reaming Valve Bodies, http://www.sonnax.com.

(Continued)

*Primary Examiner* — Daniel Howell
(74) *Attorney, Agent, or Firm* — Clifford B. Vaterlaus; Michael A. Forhan; Eley Law Firm Co., LPA

(57) ABSTRACT

A reaming tool has a generally planar base with a base opening. A stand is coupled to the base and extends away from the base, the stand having at least one cross member. A guide opening extends through the cross member. An elongate reamer has a longitudinal axis, a first end and a second, opposing end. The reamer extends through the guide opening and the base opening, with the second end of the reamer being proximal to the base opening. A set of reaming flutes are formed in the reamer proximate its second end. The reamer is slidable and rotatable in the guide opening and the base opening, and the orientation of the longitudinal axis of the reamer with respect to the base and the stand is fixed by the guide opening.

20 Claims, 5 Drawing Sheets

(56) References Cited

U.S. PATENT DOCUMENTS

| | | | |
|---|---|---|---|
| 4,082,473 A * | 4/1978 | Bratsos | 408/101 |
| 4,572,715 A | 2/1986 | Wolff | |
| 5,203,652 A | 4/1993 | Woods | |
| 5,746,551 A | 5/1998 | Skaggs | |
| 6,247,879 B1 | 6/2001 | Costa | |
| 6,386,803 B1 * | 5/2002 | Sparber et al. | 408/102 |
| 6,402,438 B1 * | 6/2002 | Boyer | 408/144 |
| 6,860,682 B1 | 3/2005 | Le Picq | |

OTHER PUBLICATIONS

Wolfcraft, Inc., Wolfcraft Drill Guide Manual, http://www.wolfcraft.de/en/.

* cited by examiner

REAMING TOOL

FIELD

The present invention relates generally to fabrication tooling, in particular to a reaming tool for the repair of fabrication tooling.

BACKGROUND

Fabrication tooling, such as welding fixtures, are often used in conjunction with a surface plate. A surface plate is a solid, flat plate used as a horizontal reference plane for precision inspection, layout, and tooling setup. The surface plate is often used as a reference plane for measurement of a workpiece placed upon or affixed to the surface plate. Consequently, a primary surface of the surface plate is a very flat planar surface, its planarity being closely controlled to facilitate accurate measurement of the workpiece.

Surface plates often include one or more datum pin holes. The datum pin holes are usually laid out in an accurate and precise geometric pattern or grid to facilitate the installation of removable attach points or supports for the tooling. For example, a welding fixture may be removably attached to a surface plate by means of a set of supports extending between the welding fixture and the surface plate.

A common problem with surface plates used in conjunction with fabrication tooling is that welding material and other debris can accumulate in the datum pin holes, rendering them unusable. Hand tools such as drills and screwdrivers may be used to repair the datum pin holes by removing the debris, but such tools are not efficient for this task. Furthermore, the datum pin holes are subject to damage by these hand tools, necessitating repair or replacement of the surface plate.

SUMMARY

A reaming tool is disclosed according to an embodiment of the present invention. The reaming tool includes a reamer that is slidably and rotatably coupled to a stand. A base supports the stand, orienting the reamer in an upright position. A biasing element biases the reamer away from the base when not in use. A handle is coupled to an upper end of the reamer. In use, the handle is grasped and the reamer is urged downwardly against the force of the biasing element, into a datum pin hole that is blocked with debris. The handle is rotated with the reamer in the datum pin hole, thereby dislodging debris therein. The reamer is sized and shaped to closely fit the datum pin hole to efficiently remove the debris. The size and shape of the reamer also reduces the risk of damage to the datum pinhole by the action of the reamer. Compressed air may also be used to urge the dislodged debris away from the datum pin hole, if desired.

In one embodiment of the present invention a reaming tool has a generally planar base with a base opening. A stand is coupled to the base and extends away from the base, the stand having at least one cross member. A guide opening extends through the cross member. An elongate reamer has a longitudinal axis, a first end and a second, opposing end. The reamer extends through the guide opening and the base opening, with the second end of the reamer being proximal to the base opening. A set of reaming flutes are formed in the reamer proximate its second end. The reamer is slidable and rotatable in the guide opening and the base opening, and the orientation of the longitudinal axis of the reamer with respect to the base and the stand is fixed by the guide opening.

The present invention also provides a method for clearing debris from a cavity of a tool. The method includes the steps of providing a generally planar base having a base opening therethrough, and coupling a stand to the base, the stand extending away from the base and having at least one cross member. A guide opening is formed in the cross member, the guide opening extending through the cross member. An elongate reamer is provided, the reamer having a longitudinal axis, a first end and a second, opposing end. The reamer extends through the guide opening and the base opening, with the second end of the reamer being proximal to the base opening. A set of reaming flutes are also formed in the reamer proximate its second end. The reamer is slidable and rotatable in the guide opening, the base opening and the cavity to clear debris from the cavity. Furthermore, the orientation of the longitudinal axis of the reamer with respect to the base and the stand is fixed by the guide opening.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

Figure 1:
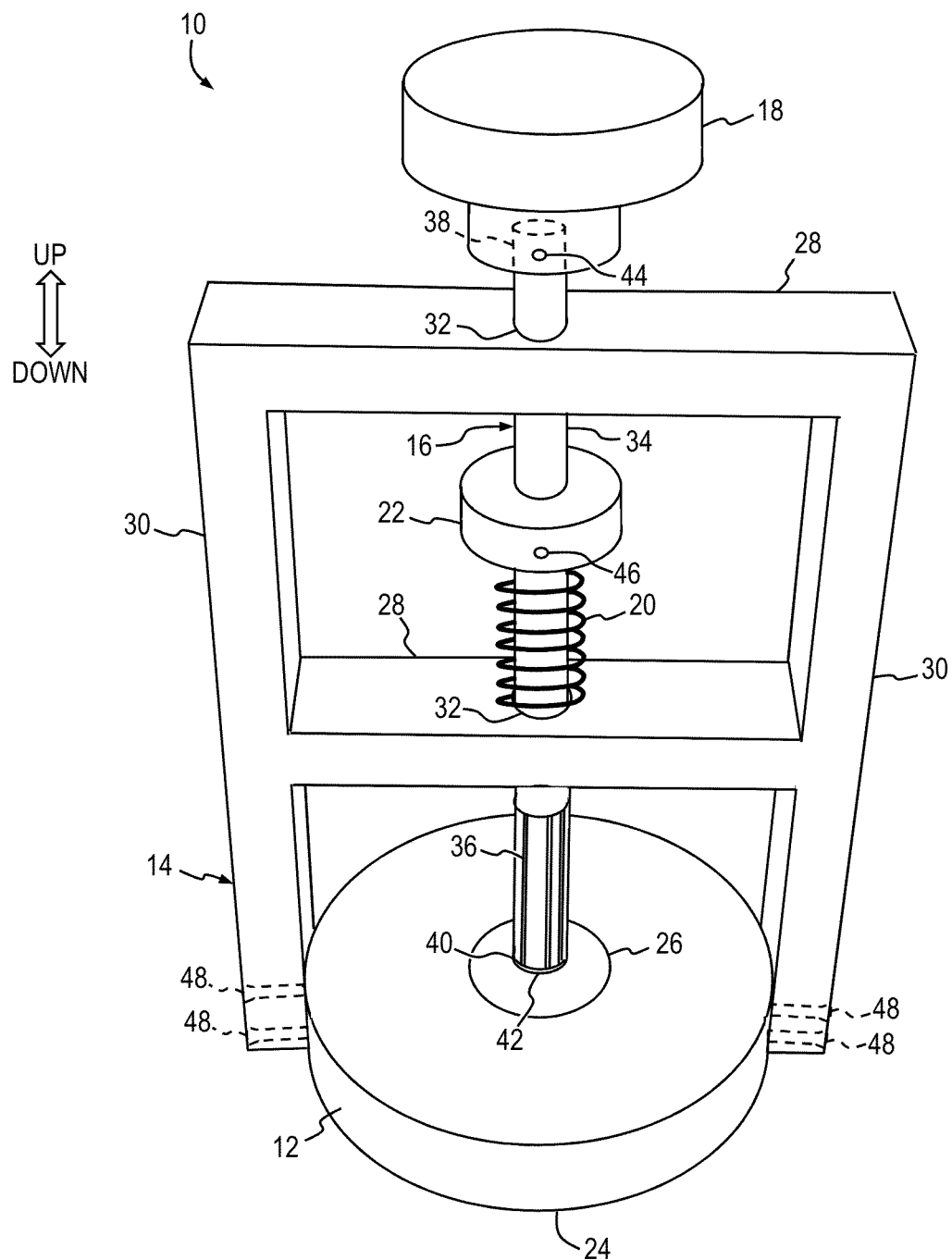
FIG. 1 is a perspective view of a reaming tool according to an embodiment of the present invention.

In the discussion that follows, like reference numerals are used to refer to like structures in the various embodiments and figures.

The general arrangement of a reaming tool 10 is shown in FIG. 1 according to an embodiment of the present invention. Reaming tool 10 includes a base 12, a stand 14, a reamer 16 and a handle 18. A biasing element 20 is retained between stand 14 and a stop 22 coupled to reamer 16, biasing the reamer upwardly and away from base 12.

Base 12 is generally planar with a generally flat lower surface 24 and a base opening 26. Base 12 may be made from any type of material suitable for the expected use and environment including, without limitation, metal, plastic and composites. In addition, base 12 may be formed in any conventional manner including, but not limited to, casting, machining, forming, molding and stamping. Furthermore, base 12 may be finished in any conventional manner, such as painting, coating, plating, molded-in colors and decorative features, or may be left unfinished. Although base 12 is shown with a generally round shape in FIG. 1 it is understood that the base may be any suitable geometric shape including, without limitation, polygonal, square, triangular, rectangular, pentagonal and octagonal within the scope of the invention.

Stand 14 is made of a unitary piece and extends upwardly and away from base 12, providing a support structure for reamer 16. A pair of generally horizontal cross members 28 extend between a pair of spaced-apart upright members 30. Cross members 28 each include a guide opening 32, the guide openings being aligned over one another. Stand 14 may be made from any type of material suitable for the expected use and environment including, without limitation, metal, plastic and composites. In addition, stand 14 may be formed in any conventional manner including, but not limited to, casting, machining, forming, molding and stamping. Furthermore, stand 14 may be finished in any conventional manner, such as painting, coating, plating, molded-in colors and decorative features, or may be left unfinished. Although stand 14 is shown with two cross members 28 and two upright members 30 in FIGS. 1 and 2 it is understood that a lesser or greater number of either or both the cross members and the upright members may be provided within the scope of the invention.

Reamer 16 comprises a generally cylindrical body having a shank portion 34 and a plurality of reamer flutes 36. Shank portion 34 of reamer 16 extends upwardly through guide openings 32 and beyond stand 14, handle 18 being attached to a first end 38 of the reamer. A second, opposing end 40 of reamer 16 extends to base opening 26, reamer flutes 36 being formed proximate the second end. Flutes 36 may include of a set of parallel straight or helical cutting edges extending upwardly from second end 40 along the length of the body of reamer 16, each cutting edge being ground at a slight angle and with a slight undercut below the cutting edge. Second end 40 may also include a tapered portion 42 to produce a self centering action of reamer 16 as it enters a datum pin hole, as discussed in more detail below. If reamer flutes 36 are helical the spiral of the helixes may be either clockwise or counter-clockwise.

Reamer 16 may be made from any suitable material including, without limitation, unalloyed or alloyed steel, "high speed steel" (HSS), carbide, cobalt and tungsten carbide. Reamer 16 may be hardened or heat treated, and may also be coated with materials including, but not limited to, titanium nitride, chemical vapor deposition of diamonds, or titanium carbon nitride to increase the usable life and durability of reamer flutes 36. In some embodiments reamer 16 is made from a unitary piece of material. Alternatively, shank portion 34 and reamer flutes 36 may be made of different materials and joined together.

Handle 18 is generally rounded and is attached to first end 38 of reamer 16 with a first set screw 44, adhesive or welding. Handle 18 may be made from any type of material suitable for the expected use and environment including, without limitation, metal, plastic and composites. In addition, handle 18 may be formed in any conventional manner including, but not limited to, casting, machining, forming, molding and stamping. Furthermore, handle 18 may be finished in any conventional manner, such as painting, coating, plating, molded-in colors and decorative features, or may be left unfinished. Although handle 18 is shown with a generally round shape in FIGS. 1 and 2 it is understood that the base may be any suitable geometric shape that would readily accommodate manual operation including, without limitation, square, rectangular, pentagonal and octagonal within the scope of the invention. In other embodiments handle 18 may be a crank-type handle.

In the embodiment of FIG. 1 biasing element 20 is a helical coil compression-type spring. Biasing element 20 is configured with predetermined characteristics including spring constant, spring index, number of coils, and free (i.e., uncompressed) length, the spring characteristics being calculated to urge reamer 16 upwardly and away from base opening 26 when tool 10 is not in use, that is, when no downward force is being applied to handle 18. Conversely, the characteristics of biasing element 20 are preferably selected such that excessive downward force is not required to urge reamer 16 into and through base opening 26. Biasing element 20 may be made from any suitable material including, without limitation, music wire, stainless steel, hard-drawn wire, polymers, and plastic. In alternate embodiments biasing element may be an elastomeric material such as foam, natural rubber and synthetic rubber, for example.

Stop 22 is attached to shank portion 34 of reamer 16 and acts to restrain biasing element 20 between stand 14 and the stop. Although stop 22 is shown positioned between cross members 28 in FIG. 1, the stop could also be positioned above the upper cross member and below handle 18, biasing element 20 being restrained between the stop and the upper cross member. Stop 22 as shown in FIG. 1 is a collar-type arrangement secured to shank portion 34 at a predetermined position with a second set screw 46. Alternatively, stop 22 may be a fastener, a rod or a wire inserted through an aperture (not shown) of shank portion 34, the fastener being of an appropriate size and shape to retain biasing element 20.

Reaming tool 10 is assembled by assembling together base 12 and stand 14 with a set of fasteners 48. Alternatively, both base 12 and stand 14 may be made as a unitary piece. Handle 18 is attached to first end 38 of reamer 16. Second end 40 of reamer 16 is inserted through guide openings 32, stop 22 and biasing element 20 as shown in the figures. Stop 22 is slidably moved along shank portion 34 to a predetermined position such that biasing element 20 will urge reamer 16 upwardly and away from opening 26 of base 12. Second set screw 46 is tightened against shank portion 34 to hold stop 22 at the predetermined position.

Figure 2:
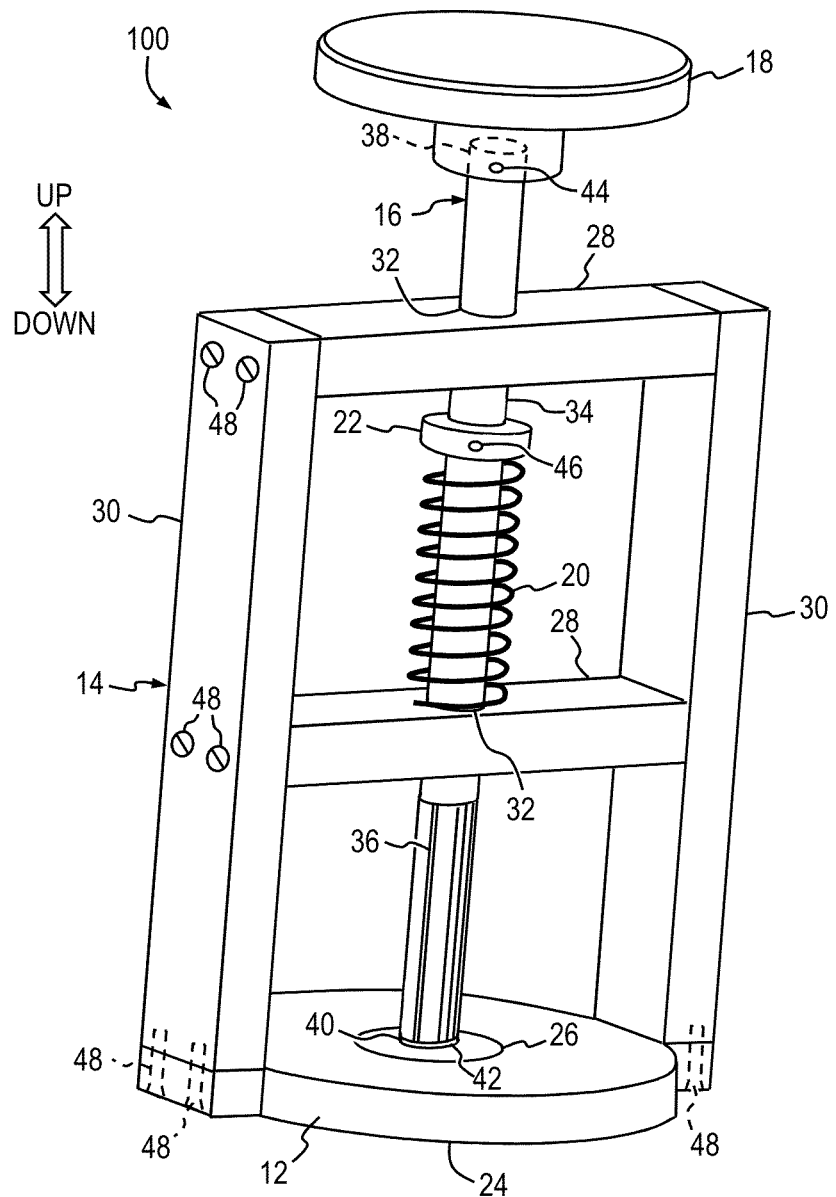
FIG. 2 is a perspective view of a reaming tool according to another embodiment of the present invention.

The general arrangement of a reaming tool 100 is shown in FIG. 2 according to another embodiment of the present invention. In this embodiment base 12, cross members 28 and upright members 30 are separate components assembled together with any or all of fasteners 48, adhesive and welds. Reaming tool 100 is otherwise similar to reaming tool 10 and thus will not be detailed further here.

Figure 3A:
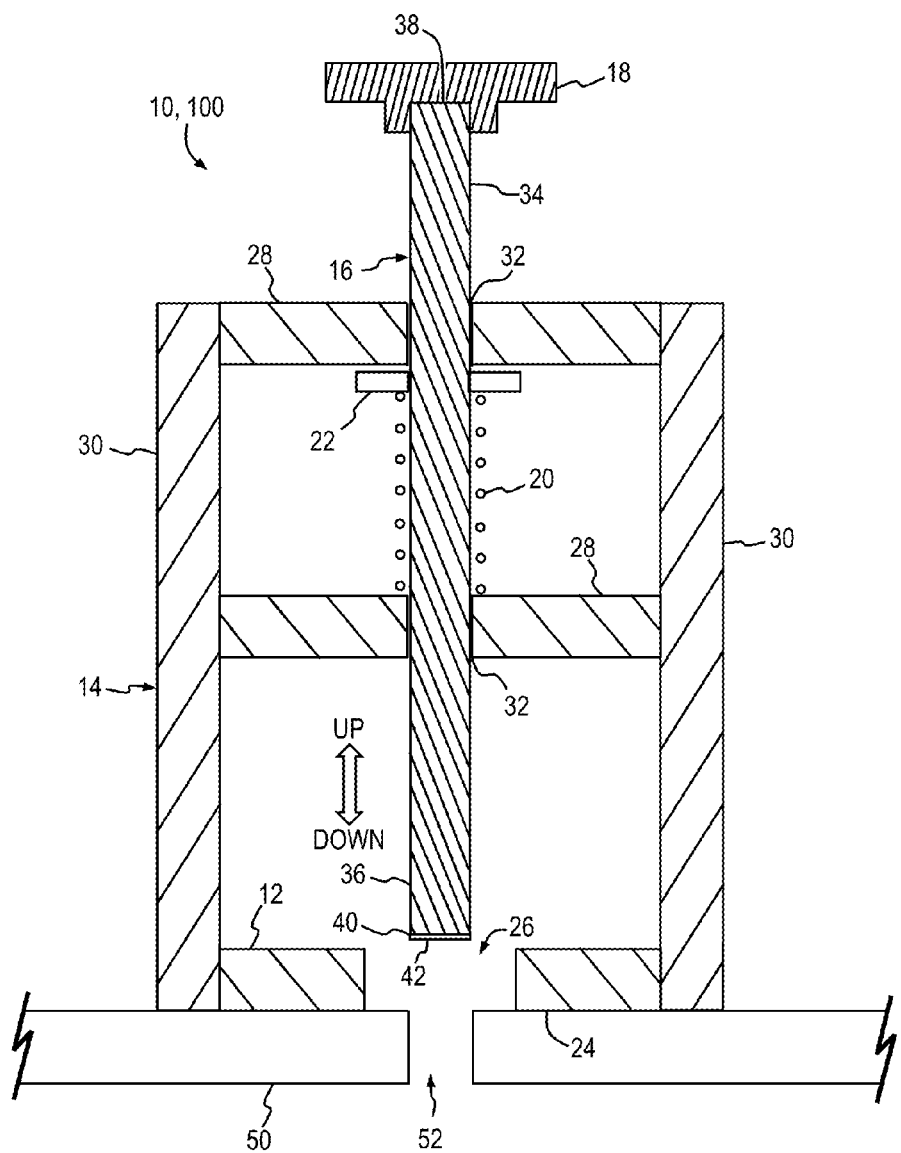
FIG. 3A is a first schematic diagram showing the reaming tools of FIGS. 1 and 2 in a stowed condition.
Figure 3B:
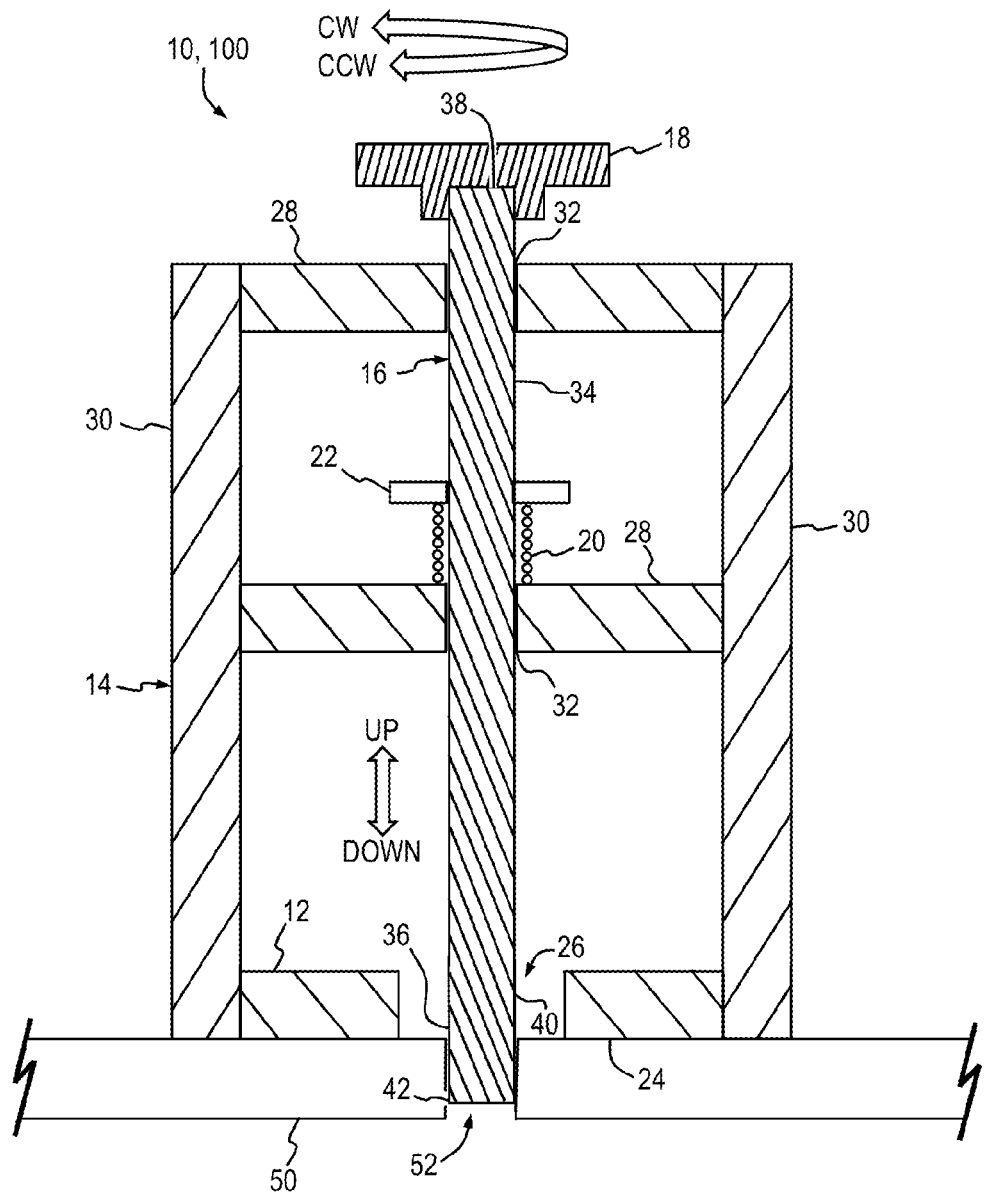
FIG. 3B is a second schematic diagram showing the reaming tools of FIGS. 1 and 2 in use.

With reference now to FIGS. 3A and 3B, in operation a user places reaming tool 10, 100 upon a surface plate 50 such that reamer 16 is positioned atop a cavity, also called a datum pin hole 52, to be cleaned of debris. The user then presses downwardly upon handle 18 with sufficient force to overcome the upward bias of biasing element 20, urging reaming flutes 36 into datum pin hole 52. While maintaining the downward force the user rotates or twists handle 18 clockwise or counter-clockwise as shown in FIG. 3B, causing the flutes to rotate in datum pin hole 52, thereby clearing debris from the datum pin hole. The dislodged material falls from datum pin hole 52 by gravity. Compressed air may also be used to urge the dislodged debris away from datum pin hole 52, if desired.

Figure 4:
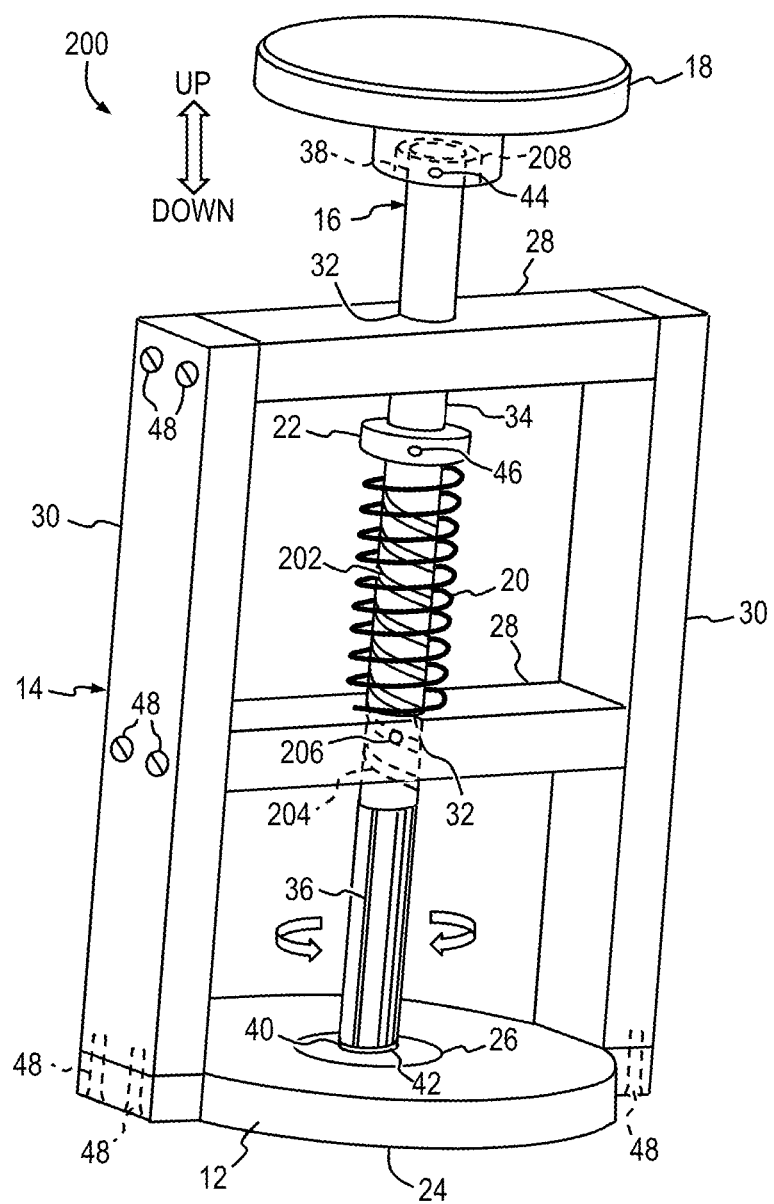
FIG. 4 is a perspective view of a reaming tool according to yet another embodiment of the present invention.

The general arrangement of a reaming tool 200 is shown in FIG. 4 according to yet another embodiment of the present invention. In this embodiment reamer 16 further includes either a clockwise or counter-clockwise helical groove 202 slidably coupled to a corresponding helical projection 204 formed in a guide opening 32 of a select cross member 28. In other configurations helical groove 202 may be formed in a guide opening 32 of a select cross member 28 and helical projection 204 may be formed upon reamer 16. Alternatively, a helical groove 202 formed in reamer 16 may slidably engage at least one guide pin 206 installed into a select cross member 28 and extending into the guide opening 32 of the cross member. In other configurations at least one guide pin 206 of reamer 16 may slidably engage a helical groove 202 formed in a guide opening 32 of a select cross member 28. Handle 18 may be rigidly coupled to reamer 16, or may be made rotatable with respect to the reamer, such as with a bearing 208.

In operation, a user places reaming tool 200 upon a surface plate 50 (FIGS. 3A, 3B) such that reamer 16 is positioned atop a datum pin hole 52 to be cleaned of debris. The user then presses downwardly upon handle 18 with sufficient force to overcome the upward bias of biasing element 20, urging reaming flutes 36 into datum pin hole 52. As reamer 16 is urged downwardly helical groove 202 and helical projection 204 (or helical groove 202 and pin 206) cause the reamer to rotate (FIG. 4), thereby clearing debris from the datum pin hole 52. The dislodged material falls from datum pin hole 52 by gravity. Compressed air may also be used to urge the dislodged debris away from datum pin hole 52, if desired. Reaming tool 200 is otherwise similar to reaming tool 10 and thus will not be detailed further here.

While this invention has been shown and described with respect to a detailed embodiment thereof, it will be understood by those skilled in the art that changes in form and detail thereof may be made without departing from the scope of the claims of the invention.

What is claimed is:

1. A reaming tool, comprising:
   a generally planar base having a base opening therethrough;
   a stand coupled to and extending away from the base, the stand including:
      a first cross member and a second cross member generally parallel to and spaced apart from each other, and
      at least two generally upright members,
      the first and second cross members extending between and coupling to the upright members;
   a guide opening extending through each of the first and second cross members, the guide openings being generally aligned over one another;
   an elongate reamer having a longitudinal axis, a first end and a second, opposing end, the reamer extending through the guide openings and the base opening, the second end of the reamer being proximal to the base opening;
   a set of reaming flutes formed in the reamer proximate its second end; and
   a biasing element positioned between the first and second cross members to urge the second end of the reamer away from the base opening,
   the reamer being slidable and rotatable in the guide openings and the base opening, the orientation of the longitudinal axis of the reamer with respect to the base and the stand being fixed by the guide openings.

2. The reaming tool of claim 1, further including:
   the first end of the reamer including a shank portion, the shank portion and the reamer flutes being made from a unitary piece of material of a substantially continuous diameter along the longitudinal axis, the shank portion of the reamer being directly received by and extending through the guide openings of the first and second cross members;
   a handle directly coupled to the shank portion proximal to the first cross member; and
   a stop directly and selectably coupled to the shank, the biasing element being retained between the stop and the second cross member.

3. The reaming tool of claim 1 wherein the biasing element is a coiled compression spring.

4. The reaming tool of 1, further including a stop coupled to the reamer, the biasing element being retained between the stop and the second cross member.

5. The reaming tool of claim 4 wherein the location of the stop is selectively adjustable along the longitudinal axis of the reamer.

6. The reaming tool of claim 1, further including a handle attached to the first end of the reamer.

7. The reaming tool of claim 1 wherein the stand is made from a unitary piece.

8. The reaming tool of claim 1, further including:
   the reamer having a shank portion; and
   a handle,
   the shank portion of the reamer extending upwardly through the guide openings of the first and second cross members and being attached to the handle.

9. The reaming tool of claim 1 wherein the first and second cross members are fixedly coupled to the upright members.

10. The reaming tool of claim 1 wherein the base has one of a generally round, polygonal, square, triangular, rectangular, pentagonal or octagonal shape.

11. The reaming tool of claim 1 wherein the flutes are generally parallel to the longitudinal axis of the reamer.

12. The reaming tool of claim 1 wherein the flutes are helical.

13. The reaming tool of claim 1 wherein the second end of the reamer further includes a tapered portion.

14. The reaming tool of claim 1, wherein:
   the reamer further includes a helical groove; and
   at least one of the first and second cross members further include a helical projection in slidable engagement with the helical groove.

15. The reaming tool of claim 1, wherein:
   at least one of the first and second cross members further include a helical groove; and
   the reamer further includes a helical projection in slidable engagement with the helical groove.

16. The reaming tool of claim 1, wherein:
   the reamer further includes a helical groove; and
   at least one of the first and second cross members further include at least one guide pin extending into the guide openings, the guide pin being in slidable engagement with the helical groove.

17. The reaming tool of claim 16, further comprising a handle rotatably coupled to the first end of the reamer.

18. The reaming tool of claim 1, wherein:
   at least one of the first and second cross members further include a helical groove formed in the guide openings; and
   the reamer further includes at least one guide pin in slidable engagement with the helical groove.

19. A reaming tool, comprising:
   a generally planar base having a base opening therethrough;
   a stand coupled to and extending away from the base, the stand including:
      a first cross member and a second cross member generally parallel to and spaced apart from each other, and
      at least two generally upright members,
      the first and second cross members extending between and coupling to the upright members;
   a guide opening extending through each of the first and second cross members, the guide openings being generally aligned over one another;
   an elongate reamer having a longitudinal axis, a first end and a second, opposing end, the reamer extending through the guide openings and the base opening, the second end of the reamer being proximal to the base opening; and
   a handle attached to the first end of the reamer;
   a biasing element positioned between the first and second cross members to urge the second end of the reamer away from the base opening;

a stop coupled to the reamer, the biasing element being retained between the stop and the second cross member; and a set of reaming flutes formed in the reamer proximate its second end, the reamer being slidable and rotatable in the guide openings and the base opening, the orientation of the longitudinal axis of the reamer with respect to the base and the stand being fixed by the guide openings.

20. A method for clearing debris from a cavity of a tool, comprising the steps of:

providing a generally planar base having a base opening therethrough;

coupling a stand to the base, the stand extending away from the base and including:

a first cross member and a second cross member generally parallel to and spaced apart from each other, and at least two generally upright members, the first and second cross members extending between and coupling to the at least two upright members;

forming a guide opening in each of the first and second cross members, the guide openings being generally aligned over one another, the guide openings extending through the cross members;

providing an elongate reamer having a longitudinal axis, a first end and a second, opposing end, the reamer extending through the guide openings and the base opening, the second end of the reamer being proximal to the base opening; and forming a set of reaming flutes in the reamer proximate its second end, positioning a biasing element between the cross members to urge the second end of the reamer away from the base opening;

the reamer being slidable and rotatable in the guide openings, the base opening and the cavity to clear debris from the cavity, the orientation of the longitudinal axis of the reamer with respect to the base and the stand being fixed by the guide openings.

* * * * *